(12) United States Patent
Richter et al.

(10) Patent No.: US 7,992,670 B2
(45) Date of Patent: Aug. 9, 2011

(54) MOTOR VEHICLE HAVING A UNIT OPERATED BY A CRYOGENICALLY STORED FUEL

(75) Inventors: Rainer Richter, Munich (DE); Carsten Schwarz, Munich (DE); Michael Schreiner, Neukeferloh (DE); Johann Tonhauser, Miesbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 222 days.

(21) Appl. No.: 12/199,559

(22) Filed: Aug. 27, 2008

(65) Prior Publication Data

US 2009/0050189 A1     Feb. 26, 2009

Related U.S. Application Data

(63) Continuation of application No. PCT/EP2007/001101, filed on Feb. 9, 2007.

(30) Foreign Application Priority Data

Feb. 28, 2006 (DE) .................. 10 2006 009 081
Feb. 28, 2006 (DE) .................. 10 2006 009 082

(51) Int. Cl.
*B60K 3/00* (2006.01)
(52) U.S. Cl. .................... 180/303; 136/205
(58) Field of Classification Search ............... 180/65.31; 136/205
See application file for complete search history.

(56) References Cited

U.S. PATENT DOCUMENTS

| | | | |
|---|---|---|---|
| 4,256,060 A | | 3/1981 | Kelly |
| 5,554,819 A | | 9/1996 | Baghai-Kermani |
| 5,644,185 A | * | 7/1997 | Miller ............. 310/306 |
| 6,166,317 A | * | 12/2000 | Volk, Jr. ........... 136/201 |
| 6,605,773 B2 | * | 8/2003 | Kok et al. ......... 136/242 |
| 6,617,738 B2 | | 9/2003 | Dickinson |
| 6,955,052 B2 | * | 10/2005 | Primlani ........... 60/776 |
| 7,253,353 B2 | * | 8/2007 | Stabler ............. 136/205 |
| 7,426,910 B2 | * | 9/2008 | Elwart ............. 123/46 E |
| 2002/0117198 A1 | | 8/2002 | Kok et al. |
| 2003/0031970 A1 | | 2/2003 | Shimada et al. |
| 2003/0047147 A1 | | 3/2003 | Daniel et al. |

(Continued)

FOREIGN PATENT DOCUMENTS

DE     195 06 486 A1     9/1996

(Continued)

OTHER PUBLICATIONS

German Search Report dated May 3, 2006 including English translation of the relevant portion (Nine (9) pages).
German Search Report dated Sep. 11, 2007 including English translation of the relevant portion (Nine (9) pages).

*Primary Examiner* — Jeffrey J Restifo
(74) *Attorney, Agent, or Firm* — Crowell & Moring LLP

(57) ABSTRACT

A motor vehicle having a unit, particularly a drive assembly, which is operated by a fuel that is cryogenically stored in a vehicle tank, is provided, in which fuel is heated by a heat exchange with a warmer medium. The fuel taken from the vehicle tank comes in contact with the cold side of a thermoelectric generator, particularly in the form of a Seebeck element, in order to generate electric current for the electric power supply of the vehicle. The warm side of the thermoelectric generator is preferably acted upon by the warmer medium also used for the heat exchange with the cold fuel, in which case the thermoelectric generator may be integrated in a heat exchanger for the heat exchange between the fuel taken and the warmer medium.

5 Claims, 1 Drawing Sheet

U.S. PATENT DOCUMENTS

| | | |
|---|---|---|
| 2004/0023087 A1 | 2/2004 | Redmond |
| 2008/0006040 A1* | 1/2008 | Peterson et al. .................. 62/116 |
| 2009/0050189 A1* | 2/2009 | Richter et al. .................. 136/201 |
| 2010/0146949 A1* | 6/2010 | Stobart et al. .................... 60/300 |
| 2010/0175413 A1* | 7/2010 | Tsubone ....................... 62/324.4 |
| 2010/0236595 A1* | 9/2010 | Bell et al. ....................... 136/205 |

FOREIGN PATENT DOCUMENTS

| | | |
|---|---|---|
| DE | 198 54 581 A1 | 6/2000 |
| DE | 103 04 165 A1 | 8/2004 |
| EP | 1 226 995 A1 | 7/2002 |
| EP | 1 420 206 B1 | 5/2004 |

* cited by examiner

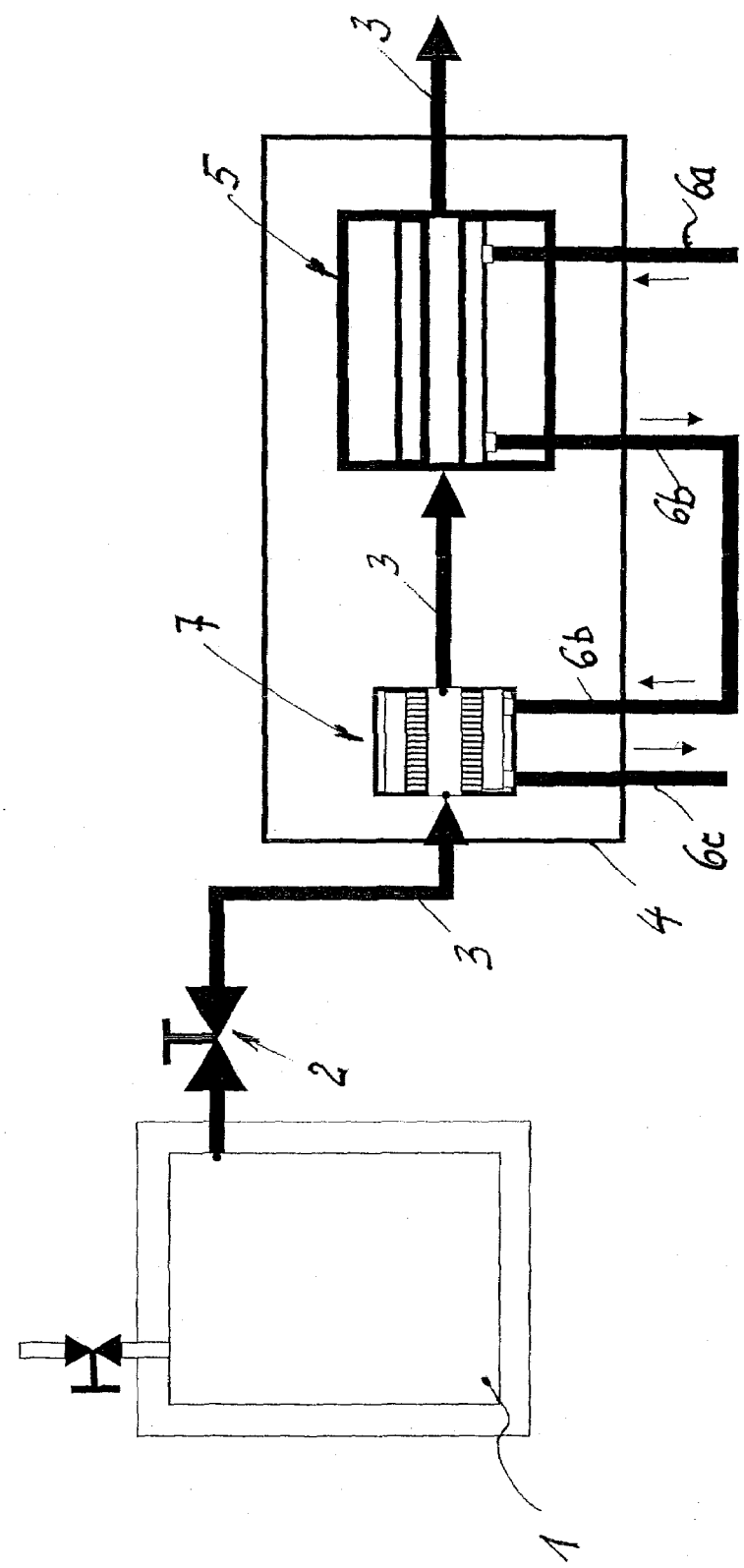

MOTOR VEHICLE HAVING A UNIT OPERATED BY A CRYOGENICALLY STORED FUEL

CROSS-REFERENCE TO RELATED APPLICATIONS

This application is a continuation of PCT Application No. PCT/EP2007/001101, filed on Feb. 9, 2007, which claims priority to German Patent Application No. 10 2006 009 081.0, filed on Feb. 28, 2006, and German Patent Application No. 10 2006 009 082.9, filed on Feb. 28, 2006, the disclosures of which are incorporated by reference herein.

BACKGROUND AND SUMMARY OF THE INVENTION

The invention relates to a motor vehicle having a unit, particularly a drive assembly, which is operated by means of a fuel that is gaseous at an ambient temperature but is cryogenically stored in a vehicle tank, which fuel is heated by a heat exchange with a warmer medium when fed to the unit. With respect to the technical background, reference is made to German Patent Document DE 195 06 486 C2 as well as to German Patent Document DE 198 54 581 A1.

Motor vehicles having so-called cryotanks are currently being developed, in which preferably hydrogen is stored as fuel preferably for the drive assembly but, as required, also for an auxiliary unit of the vehicle in an extremely cold, particularly cryogenic condition. The drive assembly may, for example, be an internal-combustion engine; the auxiliary unit may, for example, be a fuel cell, in which the electric energy is generated either only for supplying the electric on-board power supply of the vehicle or also for supplying one or more electric driving motors.

The liquid hydrogen stored in the vehicle fuel tank has to be made available as gas to the unit burning it. For this reason, an evaporation process is intermediately connected within the scope of this supply, which evaporation process takes place in a suitable heat exchanger while absorbing heat from a heat transfer medium. The coolant of the internal-combustion engine can, for example, be used as the heat transfer medium; compare, for example, the above-mentioned German Patent Document DE 195 06 486 C2.

It is basically endeavored to operate systems at an efficiency that is as high as possible. In this context, it is an object of the present invention to provide an improvement measure for a motor vehicle in which a cryogenically stored fuel is heated with a warmer medium.

The solution of this task is characterized in that the fuel taken from the vehicle tank for operating the unit is caused to come in contact with a thermoelectric generator, particularly in the form of a so-called Seebeck element, in order to generate electric current for the electric on-board power supply of the vehicle by this element.

It is thereby suggested that the low temperature of the fuel, particularly hydrogen, taken from the tank be at least partially utilized for generating electric energy and to make the latter available to the on-board power supply of the vehicle so that the usual current generator of the motor vehicle is thereby relieved. The generating of electric energy from the low temperature of the fuel in this case can take place by way of a so-called thermoelectric generator which is usually constructed of two different electric semiconductor materials which are mutually connected in a thermally and electrically conducting manner. When this pairing of materials is subjected to a temperature gradient between a heat source and a heat sink, an electric voltage is generated in this pairing of materials. As a result of a combination of a plurality of such pairings of material, when the heat source and heat sink are correspondingly efficient, economically usable electric power can be achieved. Such elements are also called Seebeck elements and represent a reversal of the known Peltier elements.

On a motor vehicle having a tank for cryogenically stored fuel, particularly a cryotank, the heat sink is particularly efficient because, when cryogenic hydrogen is the fuel, the latter is taken from the tank at a temperature of only a few degrees Kelvin.

Although the use of a thermoelectric generator on a motor vehicle having a cryotank is known, specifically from the second above-mentioned German Patent Document DE 198 54 581 A1, according to this document, the thermoelectric generator is used for generating electric energy from the heat released during the combustion of the so-called boil-off gas. The present invention differs fundamentally from this known state of the art in two aspects: On the one hand, in the present case, the low temperature of the fuel taken from the tank is utilized and not the heat generated during its combustion; on the other hand, the electric energy generation takes place during the operation of the above-mentioned unit and not during its stoppage when only boil-off gas can result.

The efficiency of the thermoelectric generator, which increases with a rising temperature gradient, can be increased when not only its so-called cold side is acted upon by the cold (cryogenic) fuel taken from the tank but, in addition, the other, so-called warm side of the thermoelectric generator is acted upon by the warmer medium also used for the heat exchange with the cold fuel. This warmer medium is usually significantly warmer than the ambient temperature that would otherwise be present on the "warm side" of the thermoelectric generator. The measure is particularly advantageous because this above-mentioned warmer medium has to be guided anyhow into the environment of the fuel taken out of the tank, specifically for the heat exchange with the latter in order to be able to feed the fuel to the above-mentioned unit in the gaseous state. In this context, it is particularly advantageous with respect to constructive aspects for the thermoelectric generator to be constructionally integrated in the heat exchanger for the heat exchange between the fuel taken from the tank and the warmer medium.

For the purpose of an advantageous further development, a motor vehicle according to the invention may additionally be equipped with a device for converting the boil-off gas of the vehicle tank which consists of a combustion device for the boil-off gas as well as another thermoelectric generator for obtaining electric energy from the heat released during this conversion process. This technology is basically known from the above-mentioned German Patent Document DE 198 54 581 A1. This document not only describes the so-called boil-off problem in connection with cryogenic fuel tanks, which is basically known to a person skilled in the art and therefore does not have to be further explained here, but it is also suggested in this document that the waste heat, which is released during the required combustion of the boil-off gas to be undesirably blown off from a cryogenic vehicle tank, be utilized in that a so-called energy converter in the form of a thermal element is acted upon by this waste heat there and can thereby generate electric current. This thermal element is therefore also a thermoelectric generator or a Seebeck element.

Another measure is now suggested here for increasing the efficiency or the electric power that can be generated, specifically that, while the so-called warm side of another thermoelectric generator provided in connection with the conversion of the boil-off gas is acted upon by the heat released particularly during the catalytic combustion of the boil-off gas, the other, so-called cold side of this additional thermoelectric generator is acted upon by the cold boil-off gas discharged from the fuel tank.

As a result of this measure, a significantly greater temperature difference between the heat source, specifically the burnt boil-off gas, and the heat sink, specifically the boil-off gas newly discharged from the cryotank, than when, for example, the ambient air is used as the heat sink can be illustrated at the additional thermoelectric generator, which is provided additionally to the above-mentioned thermoelectric generator. By the therefore considerably greater temperature difference, which may definitely by in the order of several hundred degrees, after the temperature of the cold unburned boil-off gas is in the order of a few degrees Kelvin, the electric energy which can be generated in the thermoelectric generator is naturally considerably increased.

A constructively particularly advantageous arrangement, because it is favorable with respect to space aspects as well as with a view to a best possible heat transfer between the respective elements, is obtained when a battery, that is, a plurality of thermoelectric generators, are arranged while surrounding the housing of a catalytic combustion device, and these thermoelectric generators with their side facing away from the housing of the catalytic combustion device are in a heat-transferring connection with a ring duct carrying the cold boil-off gas and surrounding the combustion device with the additional thermoelectric generators. However, instead of such a design, a matrix structure of the additional thermoelectric generator is also conceivable which is designed such that, with one side, it is in contact with the housing of a catalytic combustion device for the boil-off gas and, with the other side, it is in contact with an appropriately shaped duct or the like through which the boil-off gas is guided to the above-mentioned catalytic combustion device for oxidation.

The electric energy occurring or released at the additional thermoelectric generator can preferably be made available to a safety system for monitoring and controlling the so-called boil-off process. The reason is that, in the case of motor vehicles equipped with cryogenic fuel tanks, the continuous energy supply of a boil-off management system may be problematic. Specifically, under certain circumstances over a relatively long time period, it may be necessary to supply electric energy to a suitable sensor system, to valves as well as to an electronic monitoring unit for the process control, within the scope of which boil-off gas is blown off from the vehicle tank and is fed a or the combustion device, as well as to an ignition device of the above-mentioned combustion device. When the energy required for this purpose is know quasi generated by the necessary combustion of the boil-off gas and is intermediately stored in a suitable buffer storage device, the above-mentioned energy supply problem can be solved elegantly and advantageously with a favorable effect on efficiency.

Other objects, advantages and novel features of the present invention will become apparent from the following detailed description of one or more preferred embodiments when considered in conjunction with the accompanying drawing.

BRIEF DESCRIPTION OF THE DRAWINGS

The sole FIGURE is a schematic illustration of a cryogenic fuel system in accordance with an embodiment of the present invention.

DETAILED DESCRIPTION OF THE DRAWINGS

Reference number 1 marks a cryogenic fuel tank (=vehicle tank) of a motor vehicle for storing liquid hydrogen in a cryogenic condition, from which tank hydrogen is can be taken as fuel by way of a valve 2 and can be fed by way of a pipe 3 to a not shown vehicle unit for combustion. This pipe 3 extends through a so-called secondary system capsule 4 in which the heat exchanger 5 is provided wherein the pipe 3 is in a heat exchange with a warmer medium brought by way of another pipe 6a and removed by way of a pipe 6b, so that the cold hydrogen in the pipe 3 is heated in this heat exchanger 5 and is thereby changed into the gaseous state. With respect to the transport of the hydrogen in the pipe 3, a thermoelectric generator 7 is provided upstream of this heat exchanger 5 in the so-called secondary system capsule 4, the cold side of the thermoelectric generator 7 being in a heat-conducting connection with the pipe 3 and thereby with the cold hydrogen carried therein, and the warm side of the thermoelectric generator 7 being in a heat-conducting connection with the above-mentioned warmer medium brought by way of the pipe 6b and removed by way of a pipe 6c. As a result of the temperature gradient in the order of several hundred degrees therefore present at the thermoelectric generator 7, by the thermoelectric generator, electric current can be generated or electric power can be obtained, specifically at customary efficiencies and with an acceptable size of this thermoelectric generator and of the mass flow acting upon the latter, particularly of cold hydrogen in a remarkable or significant amount. When the thus obtained electric energy is fed to the electric on-board power supply of the vehicle, it can be utilized and thereby relieves an electric energy producing device which continues to be present, so that the overall efficiency of the vehicle can be increased. It should also be pointed out that a plurality of details may be constructed to deviate from the above explanations without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A motor vehicle, comprising:
a drive assembly unit;
a cryogenic fuel storage tank for storing a fuel that is gaseous at an ambient temperature which is supplied to the drive assembly unit to operate the unit; and
a thermoelectric generator, the thermoelectric generator configured to generate electric current when exposed to a thermal gradient,
wherein
fuel taken from the fuel storage tank acts on a cold side of the thermoelectric generator in order to generate electric current for the electric on-board power supply of the vehicle,
the thermoelectric generator is arranged such that while the cold side of the thermoelectric generator is acted on by the fuel taken from the fuel storage tank, a warm side of the thermoelectric generator is acted on by a warmer medium, said warmer medium being also used for heat exchange with the fuel at location away from the thermoelectric generator, and
the thermoelectric generator is integrated in a heat exchanger for heat exchange between the fuel taken from the fuel storage tank and the warmer medium.

2. The motor vehicle according to claim 1, further comprising:
- a fuel storage tank boil-off gas converter, the boil-off gas converter being arranged to combust boil-off gas from the taken from the fuel storage tank; and
- a second thermoelectric generator for obtaining electric energy from the heat released during the boil-off gas combustion,
- wherein, a warm side of the second thermoelectric generator is acted upon by heat released during combustion of the boil-off gas, and a cold side of the additional thermoelectric generator is acted upon by boil-off gas passing from the fuel storage tank to the boil-off gas converter.

3. The motor vehicle according to claim 2, wherein the boil-off gas converter is a catalytic combustion device.

4. The motor vehicle according to claim 3, wherein
- a battery of additional thermoelectric generators are arranged surrounding the housing of the catalytic combustion device or in a matrix structure about the catalytic combustion device in a tangent manner, and
- the additional thermoelectric generators are arranged with their respective warm sides facing toward the catalytic combustion device and their respective cold sides facing away from the catalytic combustion device, the cold sides being acted on in a heat-transferring connection by a ring duct or duct adapted to the matrix, the duct carrying boil-off gas.

5. The motor vehicle according to claim 4, wherein
the electric energy generated by at least one of the thermoelectric generators is made available to a safety system for monitoring and controlling a boil-off process occurring in the vehicle.

* * * * *